Patented June 16, 1953

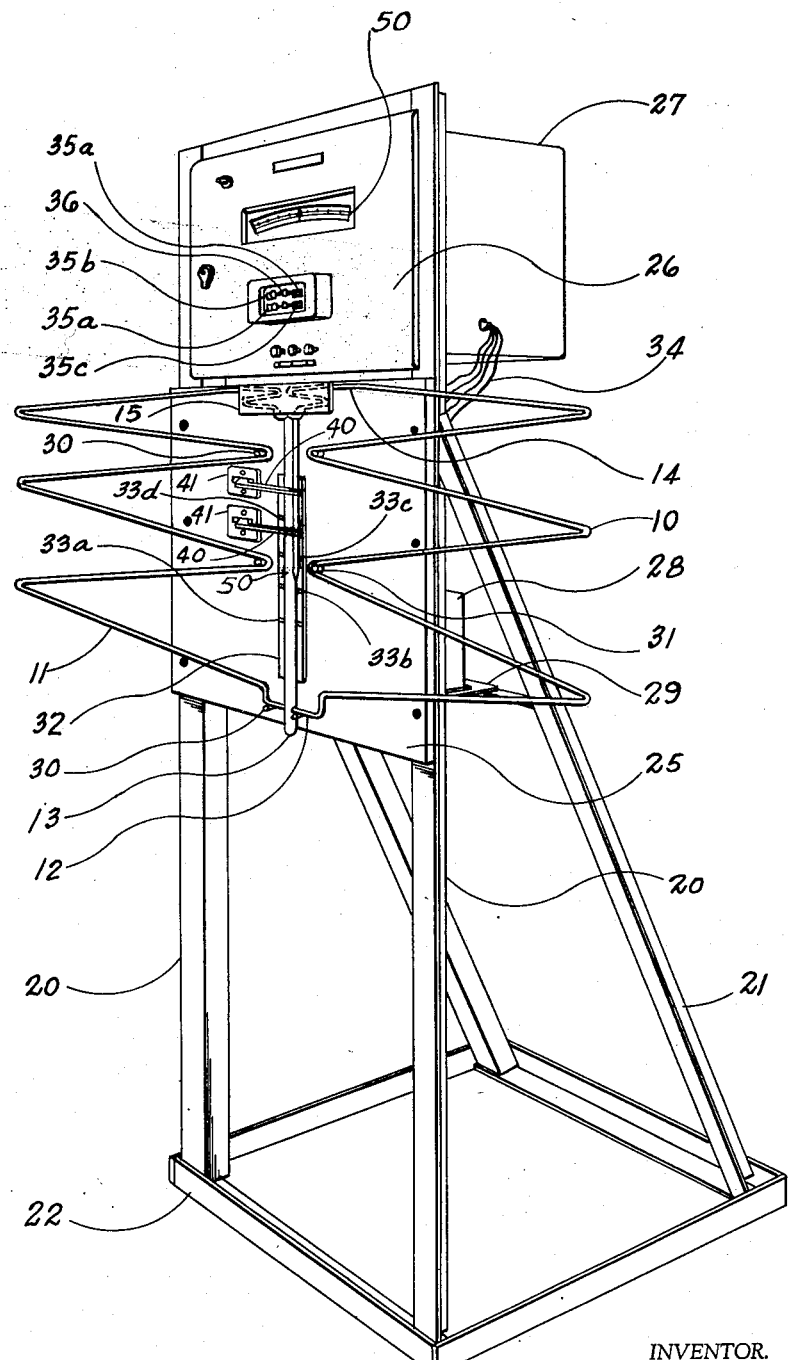

2,641,929

UNITED STATES PATENT OFFICE 2,641,929

REFRIGERANT TESTING SYSTEM

Floyd R. Eck, Des Plaines, Ill., assignor to Admiral Corporation, Chicago, Ill., a corporation of Delaware Application October 4, 1947, Serial No. 777,900

3 Claims. (Cl. 73—295)

This invention relates to a method and apparatus for determining the level of a liquid in a conduit and is particularly useful in determining the level of a liquid refrigerant in a closed refrigerating system.

The invention about to be described will be described particularly with reference to determining the liquid level of a refrigerant in a refrigerating system. It will be appreciated, however, that its application is not limited to such use, and that many other uses for the invention will be apparent to those versed in the art.

In a refrigerating system, such as disclosed in the application of Evans T. Morton, Ser. No. 720,080, filed January 3, 1947, now Patent No. 2,586,853 wherein there is illustrated a household refrigerator of the so-called two temperature type, there is provided a primary system which includes the motor compressor, the condenser and the evaporator unit. In this case, the evaporator unit is of the type which comprises a conduit disposed around a low temperature compartment. There is also a moist cold compartment mainly for the preservation of foods without freezing. In this instance, the moist cold compartment is cooled by a system that includes a closed conduit which is conductively connected to the primary system and, therefore, may be considered as a secondary system.

One of the conditions of a most satisfactory operation of such a two-temperature system is to provide a certain predetermined level of the refrigerant in the secondary system. It is desirable, therefore, to be able to determine the level of the refrigerant which is somewhat difficult due to the fact that the system is hermetically sealed.

The present invention, therefore, is particularly useful in determining the fluid level in a sealed conduit. It will be appreciated, however, that the invention is not limited to the use of determining the level of fluid in a sealed conduit or for determining the level of fluids in refrigerating systems but can be used in many other places for determining fluid levels.

The drawing shows a perspective view of an apparatus utilizing my invention.

As a specific example of the usefulness of my invention, I show in the drawing an apparatus particularly adapted to determine the refrigerant level in a closed conduit secondary refrigerating system.

In this case, the secondary system includes the laterally extending branch tubings 10 and 11 which are the evaporator coils and the bottom ends 12 of which connect to the down tube 13 and the upper condenser portion 14. The lateral portions extend upward in zigzag formation meeting at the top 14. As shown in said application, the top portion of the tubing is soldered or brazed to a plate 15 whereby it is maintained in good thermal contact therewith. The juncture of the two tubes 11 and 10 is connected to the upper end of the down tube 13. The lower end of the down tube extends slightly below the point of connection with the tubes 11—10 and together with the two tubes 10—11 which are bent downward and laterally at 12, provide a well or sump which assists in preventing reverse flow of the refrigerant during operation.

Broadly, the invention comprises supporting the tubing containing the refrigerant in such a manner that the liquid refrigerant seeks a level in the lower portion of the system. While supported in this position, a section or zone of the tubing preferably above the supposed fluid level is heated. Temperature readings are taken throughout spaced points in this zone and the point where the greatest temperature difference between the readings occurs is established as the point of the fluid level because the tube will be hotter where there is vapor and cooler where there is liquid due to the greater heat conductivity of the liquid.

More specifically, I support the tubing which comprises the system in a substantially vertical plane. I then select a portion on the tubing which extends in as vertical a direction as is possible. This section or zone of tubing should, if the tubing is properly filled with refrigerant, be just above the points as having been established as the proper level to which the system is filled. I then apply an electric current to the opposite extremities of this zone, which current flows between the two points causing the tubing to be heated throughout the zone.

Before applying current to the tube, I provide temperature reading means to the tubing at spaced intervals along the zone. Before heat is applied, it being assumed that the tubing and its contents are at a room temperature, the readings of all the temperature indicating means should be the same. Upon application of the current to the tubing, the tubing will immediately be heated due to the resistance to the flow of current. The tubing will, however, become hotter at the level above the liquid than below the liquid because the conductivity of the liquid below fluid level will carry the heat away. Therefore, the temperature indicating means will register a greater temperature rise at points above the fluid level than at points below the fluid level. It will be apparent that the degree of accuracy with which the level may be determined will largely be dependent on the proximity of the readings or indications to each other taken at the fluid level. Therefore, the greater number of points along a zone which extends above and below the fluid level, the greater the degree of accuracy with which the level may be determined.

It will be noted that I have stated that the resistance type of heating is used. This is, however, a matter of choice, since the section of tubing may be heated in other manners well known to those versed in the art and is not limited to resistance heating. For instance, the heating could be effected by radio frequency currents or in some cases by radiant heat. Furthermore, the heat could be applied at one point along the tubing and be transferred to the other points conductively. For instance, the heat could be applied to the tube well above the fluid level and the level determined by the point where a drop in temperature was observed, or the heat could be applied to a zone which extended above and below the fluid level. Also, a single movable thermally responsive device could be used, preferably one having a quick reaction to changes in temperature, and the point of temperature difference determined by moving the same in sufficiently close contact with the tube being heated upward or downward on the tube and observing the point where a drop or rise in temperature occurred.

I have found that an apparatus such as shown in the figure of the drawings is especially suited for determining the fluid level in secondary refrigeration systems. In this case, I provide a rack which includes the vertical upright 20 and the inclined braces 21, all secured to a base 22.

The front of the rack carries a panel 25 secured to the rack in any suitable manner. The upper end of the rack carries a control panel 26 on the face of which are mounted the indicating instruments, the bodies of which are disposed in a protecting housing 27. A power transformer 28 is supported at the lower rear of the panel on a bracket 29.

The front of the panel 25 is provided with a plurality of outwardly extending pegs 30, so disposed as to cooperate with the tubing system and support the same. In this case, the down tube 13 lies against a rubber pad 32 in which, at spaced vertical points, are embedded metallic contact strips 33.

Hingedly supported electrode clamps 40 are provided carried on brackets 41 and disposed at the extremities of the zone to be heated. These electrode clamps are spring pressed toward the down tube 13 against which they make a good electrical contact. These clamps are preferably of brass or copper and are provided with a carbon contact for engagement with the tube.

In the drawing I have shown four metal contact strips 33; each of these is provided with a thermocouple, the leads 34 of which extend up into the housing 27 and are in turn connected to corresponding switches 35 on the front of the panel 26.

It will be apparent that the thermocouples could be in actual thermal contact with the tubing should it be desired, it being more expedient in this case to provide the thermal contact with the metal strips and they in turn to make contact with the down tube 13.

It will be noted that the rubber pad 32 extends from or is slightly raised from the panel. The tubing is, therefore, supported slightly spaced from the panel on the pins 30, and the electrode clamps 40 exert sufficient pressure on the down tube 13 to cause this tube to make intimate contact with the strips 33. The strips 33 are also capable of some movement toward and from the panel and, therefore, intimate contact is made therewith even though the down tube 13 is not perfectly straight. It will be appreciated that the range of movement of the contact strips could be greatly extended to take care of tubing having large irregularities should it be desirable.

In operation, the electrode clamps 40 are swung to an open position, the tubing unit placed on the pegs 30 and then the clamps swung to the position shown where the clamps engage the down tube electrically and mechanically hold the unit in place against the pad 32 and its associated thermocouples. A reading of the thermocouples is taken and adjustment made if necessary by pushing the appropriate switch 36 to bring them all into the same range.

Current is then applied by closing the switch which controls a relay connecting the output of the low voltage high current transformer 28 to the electrode clamps 40. The current thus flows through the down tube 13 causing the same to be heated. This heat in turn is read at the different points 33 by the meter 50. The current flow is maintained until such a time as a difference in temperature is indicated by the different thermocouples or until such a time as the total temperature rise of all the indicators shows that the system is either altogether too low or too full.

If it be established that the fluid level can be any place between the points 33b and 33c as indicated by the arrow 50, then the temperatures between 33b and 33c as indicated by the meter will show a marked degree of difference. If, however, the difference existed between 33a and 33b or 33c and 33d, this would indicate that the fluid level was too low or too high respectively.

It will thus be seen that I can determine the fluid level in production of secondary refrigeration systems quickly and simply by this application of my invention.

Although I have illustrated a potentiometer type meter, with switches for determining the temperature at the various thermocouples, it will be appreciated that separate indicating means could be employed for each thermocouple and then enable all of the readings to be observed simultaneously.

Having thus described my invention, I am aware that numerous and extensive departures may be made therefrom without departing from the spirit or scope of my invention.

I claim:

1. An apparatus for determining the level of a fluid in a conduit which comprises a support for supporting the conduit in an upright position, electrical means for supplying a current to said conduit connected thereto at spaced points along the conduit for heating the conduit in a zone extending above and at least to the supposed fluid level, thermocouples conductively connected to said conduit responsive to the heat of the conduit at different parts of said zone and means to determine the voltage output of said thermocouples.

2. An apparatus for determining the level of a fluid in a conduit comprising means for supporting the conduit so that the fluid seeks a level in the conduit means to apply a heating current to said conduit comprising clamps for engaging the conduit on said support, resilient means disposed between the conduit and said support and thermocouples carried by said resilient means said clamps adapted to press said conduit into heat conducting relation with said thermocouples and indicating means to indicate the output of said thermocouples.

3. The method of determining the level of refrigerant in a closed conduit refrigerating system which comprises supporting said conduit in a substantially vertical plane whereby the refrigerant seeks a level in the system, passing an electric current through a portion of said conduit between spaced points on said conduit to heat the conduit in a zone extending above and below the level of said fluid, maintaining said heat until the temperature of the conduit is raised higher above the fluid level than below the fluid level, measuring the temperature of said tube at different points in said heating zone to determine the places where vapor and fluid exist and determining the place where the fluid level ceases by the greater difference in temperature between closely spaced points in said zone.

FLOYD R. ECK.

References Cited in the file of this patent

UNITED STATES PATENTS

| Number | Name | Date |
|---|---|---|
| 1,359,914 | Petersen | Nov. 23, 1920 |
| 1,823,397 | Guy | Sept. 15, 1931 |
| 1,962,187 | Flock | June 12, 1934 |
| 2,188,303 | Roberts | Jan. 30, 1940 |
| 2,279,043 | Harrington | Apr. 7, 1942 |